United States Patent
Kamigama

(10) Patent No.: US 6,507,459 B1
(45) Date of Patent: Jan. 14, 2003

(54) HEAD SLIDER SUSPENSION, HEAD ASSEMBLY, AND INFORMATION RECORDING AND REPRODUCING APPARATUS WITH IMPROVED WIRING PATTERN

(75) Inventor: Takehiro Kamigama, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/524,277

(22) Filed: Mar. 13, 2000

(30) Foreign Application Priority Data

Mar. 17, 1999 (JP) .......................................... 11-071280

(51) Int. Cl.⁷ ................................................. G11B 5/55
(52) U.S. Cl. .................................................. 360/245.9
(58) Field of Search ............................... 360/240–294.7

(56) References Cited

U.S. PATENT DOCUMENTS

| | | | | |
|---|---|---|---|---|
| 5,134,532 A | * | 7/1992 | Svendsen | 360/264.4 |
| 5,414,576 A | * | 5/1995 | Ueki | 360/234.5 |
| 5,557,489 A | * | 9/1996 | Nakashima | 360/234.5 |
| 5,970,602 A | * | 10/1999 | Harada | 360/244.2 |
| 6,205,003 B1 | * | 3/2001 | Iwamoto | 360/245.9 |

FOREIGN PATENT DOCUMENTS

| | | |
|---|---|---|
| JP | 59-168906 | 9/1984 |
| JP | 60-101776 A | 6/1985 |
| JP | 64-56078 | 4/1989 |
| JP | 1-130318 | 5/1989 |
| JP | 1-285061 | 11/1989 |
| JP | 6-70848 | 9/1994 |
| JP | 07-226043 A | 8/1995 |
| JP | 7-122984 | 12/1995 |
| JP | 10092124 | 4/1998 |
| JP | 2811942 | 8/1998 |
| JP | 10-255421 A | 9/1998 |
| JP | 11-039629 A | 2/1999 |

OTHER PUBLICATIONS

"Development of Ultra–High–Density External Memory" Nikkei Electronics Book, Published on Jun. 17, 1998, pp. 46–48.

* cited by examiner

*Primary Examiner*—A. J. Heinz
(74) *Attorney, Agent, or Firm*—Oliff & Berrdige, PLC

(57) ABSTRACT

Provided are a head slider suspension, a head assembly and an information recording/reproducing apparatus, which can reduce manufacturing cost by reducing the number of components and can be flexible in the production of a small quantity of many types. A magnetic head assembly comprises a head slider, a head slider suspension for supporting the head slider, a wiring unit attached to the head slider suspension, and a coil. The head slider suspension includes a slider support section for functioning as a gimbal, a suspension section for supporting the slider support section, an arm section for supporting the suspension section, and a coil support section for supporting the coil. These elements constitute a part of a continuous structure either a wiring pattern extending from the first surface of the continuous structure, around one end of the continuous structure and to the second surface, reaches the slider support section and covers the surface of the slider support section, on which the head slider is to be placed, or the wiring pattern extending from the first surface of the continuous structure, via a communication hole bored through a part of the continuous structure and to the second surface, reaches the slider support section and covers the surface of the slider support section, on which the head slider is to be placed.

12 Claims, 14 Drawing Sheets

HEAD SLIDER SUSPENSION, HEAD ASSEMBLY, AND INFORMATION RECORDING AND REPRODUCING APPARATUS WITH IMPROVED WIRING PATTERN

BACKGROUND OF THE INVENTION

1. Field of the Invention

The present invention relates to a head slider suspension for mounting thereon a head slider having at least either a recording element or a reproducing element, a head assembly having the head slider suspension and the head slider mounted thereon, a method of manufacturing the same and an information recording/reproducing apparatus comprising the head assembly. For example, this invention relates to a head slider suspension using a magnetic head element as the recording element or the reproducing element, a head assembly, a method of manufacturing the same and an information recording/reproducing apparatus.

2. Description of the Related Art

In general, a head assembly for use in an information recording/reproducing apparatus such as a magnetic disk device comprises a slider support section capable of floatably supporting a head slider having a head element, a suspension section for supporting the slider support section, and an arm section for supporting the suspension section and to be driven by a driving mechanism such as a VCM (voice coil motor). While the head slider is levitated at a fixed distance from a surface of a disk-shaped magnetic recording medium by such a mechanism, information is reproduced from or recorded on the recording medium such as a magnetic disk by the head element, and the head slider can be moved along the surface of the magnetic recording medium.

On the other hand, this type of apparatus generally has a plurality of magnetic recording media and a plurality of head sliders because of a recent request for a large storage capacity. Such an apparatus has a structure in which one head slider is disposed so as to face each magnetic recording medium surface and each head slider is supported by each individual suspension section. Heretofore, a plurality of arm sections have been integrally molded by molding or the like for the purpose of reducing cost and other purposes, as disclosed in Japanese Unexamined Patent Application Publication No. 4-76882 (Japanese Examined Patent Application Publication No. 7-122984) or Japanese Unexamined Patent Application Publication No. 10-92124, for example. Moreover, as disclosed in these publications or Japanese Unexamined Patent Application Publication No. 1-130318, the suspension sections for supporting the head sliders are formed separately from the arm sections and then the suspension sections are connected to the individual arm sections. That is, one head actuator assembly (hereinafter referred to as an HAA) has heretofore comprised a plurality of arm sections, a plurality of suspension sections and a plurality of head sliders as a whole.

The related art of this type of technique is that an arm and a gimbal constituting a part of the slider support section are integrally molded as disclosed in Japanese Unexamined Utility Model Application Publication No. 64-056078 or Japanese Unexamined Patent Application Publication No. 01-285061, for example. Moreover, an example, in which an IC chip is mounted on a slider support mechanism comprising the suspension and the arm, is described in Japanese Examined Patent Application Publication No. 06-070848, for instance.

For one HAA comprising a plurality of arm sections, a plurality of suspension sections and a plurality of head sliders as described above, it is, however, difficult to: reduce the cost while meeting a demand for production of a small quantity of many types. The reason is as follows. Many types of HAAs, each of which meets a unique specification, must be provided in order to produce various kinds of disk apparatus each of which meets a unique specification. (e.g., the storage capacity or the like). This is not efficient in design, manufacturing and inventory control.

When the suspension sections are formed separately from the arm sections and then the suspension sections are connected to the arm sections as described above, there is a problem that the number of components is increased and thus the manufacturing and component control are complicated.

On the other hand, a head support mechanism comprising an integral structure having a flexure section for supporting a head, the arm section for supporting the flexure section and a carriage body section for supporting the arm section is disclosed in Japanese Unexamined Patent Application Publication No. 4-123376 (Japanese Patent No. 2811942), for example. This mechanism can solve the problem caused by lack of strength of junction between the components. Thus, this apparatus can achieve a reduction in the number of components of the whole apparatus, or the like.

However, this head support mechanism has a problem. To actually incorporate. the head support mechanism into the magnetic disk apparatus, two head supporters each of which takes the form of the integral structure are connected by means of a ring in combination with each other, and a pair of connected head support apparatuses is attached to a shaft. Moreover, a wire-wound coil for driving the voice coil motor constituting a part of the driving mechanism for driving the head support apparatuses is supported in such a manner that the coil is located between the two head support apparatuses. In other words, a pair of head support apparatuses is substantially treated as one assembly, and the individual head support apparatuses cannot be independently treated. Thus, this apparatus is considered to have difficulty in being sufficiently flexible in the production of a small quantity of many types.

SUMMARY OF THE INVENTION

The present invention is designed to overcome the foregoing problems. It is an object of the invention to provide a head slider suspension, a head assembly, a method of manufacturing the same and an information recording/reproducing apparatus, which can reduce a manufacturing cost by reducing the number of components and can be flexible in the production of a small quantity of many types.

A head slider suspension of the present invention on which a head slider including a head element capable of at least either recording or reproducing information to/from a recording medium and a driving coil constituting a part of a driving mechanism for moving the head slider relatively to the recording medium can be mounted, comprises only one slider support section capable of floatably supporting the head slider; and only one coil support section corresponding to the slider support section and being capable of supporting the driving coil by itself, wherein the slider support section and the coil support section constitute a part of a continuous structure including no joint area.

In the head slider suspension of the present invention, one coil support section is provided corresponding to one slider support section, and the slider support section and the coil support section constitute a part of the continuous structure including no joint area. Accordingly, each head slider suspension can individually support the driving coil. Thus, each head slider suspension can be independently treated and driven.

Another head slider suspension of the present invention may further comprise only one suspension section for supporting the slider support section; and only one arm section for supporting the suspension section, wherein the suspension section and the arm section constitute a part of the continuous structure. Preferably, the suspension section is flexible and the arm section is rigid. The driving mechanism may be constructed so as to swing the head slider around a predetermined fixed pivot externally located. The head slider suspension may further comprise a connect section including a hole which the fixed pivot is to be inserted through. In this case, preferably, the connect section constitutes a part of the continuous structure.

Still another head slider suspension of the present invention may further comprise a wiring pattern electrically connectable to the head slider. Preferably, the wiring pattern extends from the first surface to the second surface of the continuous structure. This wiring pattern may extend from the first surface of the continuous structure, around one end of the continuous structure and to the second surface, reach the slider support section and cover the surface of the slider support section, on which the head slider is to be placed. The wiring pattern may also extend from the first surface of the continuous structure, via a communication hole bored through a part of the continuous structure and to the second surface, reach the slider support section and cover the surface of the slider support section, on which the head slider is to be placed.

A further head slider suspension of the present invention may further comprise an integrated circuit chip on which circuits associated with an operation of the head slider are integrated. The integrated circuit chip may be located on the continuous structure surface facing the recording medium.

Still another head assembly of the present invention comprises a head slider suspension having any one of the above constitutions; and a head slider floatably supported by the slider support section of the head slider suspension. Preferably, the head slider is located on the wiring pattern covering the slider support section.

A method of manufacturing a head slider suspension according to the present invention is applied to manufacture a head slider suspension on which a head slider including a head element capable of at least either recording or reproducing information to/from a recording medium and a driving coil constituting a part of a driving mechanism for moving the head slider relatively to the recording medium can be mounted. The method comprises the steps of forming only one slider support section capable of floatably supporting the head slider; and forming only one coil support section corresponding to the slider support section, the coil support section being capable of supporting the driving coil by itself, wherein the two steps are substantially concurrently executed, whereby the slider support section and the coil support section constitute a part of a predetermined-shaped continuous structure including no joint area.

In the method of manufacturing a head slider suspension according to the present invention, the step of forming the slider support section and the step of forming the coil support section are substantially concurrently executed, whereby the slider support section and the coil support section constitute a part of a predetermined-shaped continuous structure including no joint area.

Another method of manufacturing a head slider suspension according to the present invention may further comprises the steps of forming only one suspension section for supporting the slider support section; and forming only one arm section for supporting the suspension section, wherein these steps are executed substantially concurrently with the steps of forming the slider support section and the coil support section, whereby the suspension section and the arm section also constitute a part of the continuous structure. The step of forming the continuous structure can include a rolling step of partially rolling one plate material and thereby forming the material having portions differing in thickness; and a die cutting step of applying die cutting to the rolled material. Alternatively, the step of forming the continuous structure may include a mold forming step of forming a mold having a cavity with a shape corresponding to an outer shape of the continuous structure; and a step of filling the cavity of the mold with a predetermined material and solidifying the material.

A method of manufacturing a head assembly according to the present invention comprises the steps of forming a head slider suspension by any one of the above methods of manufacturing the head slider suspension; and mounting the head slider on the formed head slider suspension.

An information recording/reproducing apparatus of the present invention comprises a recording medium on which information can be recorded; a head assembly; and a driving mechanism for driving the head assembly so as to make the head slider of the head assembly move relatively to the recording medium. The information recording/reproducing apparatus comprises a plurality of head assemblies, wherein the head assemblies are independently driven, whereby the respective head sliders of the head assemblies are movable independently.

Other and further objects, features and advantages of the invention will appear more fully from the following description.

BRIEF DESCRIPTION OF THE DRAWINGS

FIG. 5 is a perspective view of the external constitution of a magnetic disk apparatus which the head assembly according to one embodiment of the present invention is applied to;

DETAILED DESCRIPTION OF THE PREFERRED EMBODIMENTS

Figure 5:
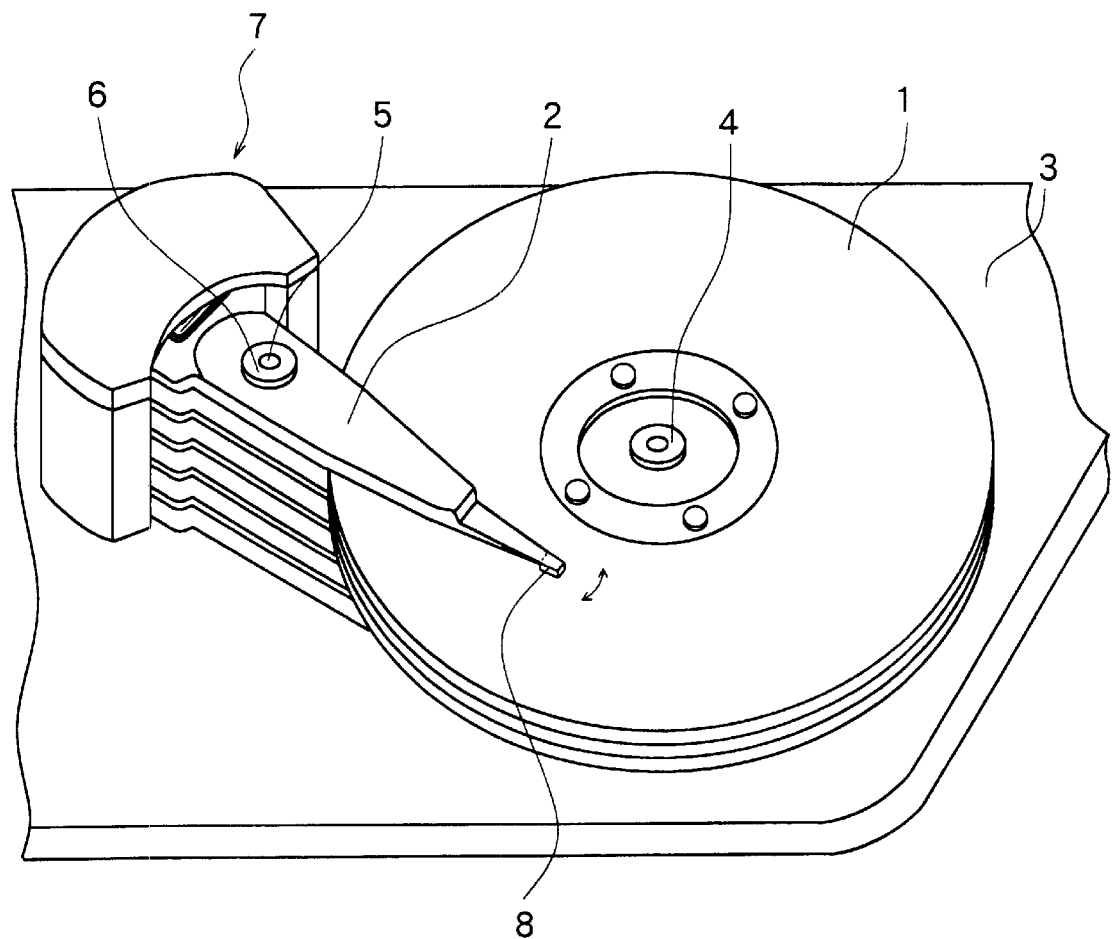

Embodiments of the present invention will be described in detail below with reference to the accompanying drawings.
First Embodiment FIG. 5 shows an external view of a magnetic disk apparatus which employs a head slider suspension and a head assembly according to the first embodiment of:the present invention. In this embodiment, the magnetic disk apparatus using a method called a CSS (Contact-Start-Stop) method will be exemplified and described. This magnetic disk apparatus comprises a plurality of magnetic disks 1 (hereinafter simply referred to as disks 1) as recording media, and a plurality of magnetic head assemblies 2, each assembly corresponding to each disk surface. The disk 1 is rotated by a spindle motor 4 fixed to a housing 3. The magnetic head assembly 2 is rotatably attached to a fixed pivot 5 fixed to the housing 3, through a bearing 6. In this embodiment, the plurality of magnetic head assemblies 2 are attached to the fixed pivot 5 through the common bearing 6, whereby the plurality of magnetic head assemblies 2 are integrally swung. A magnetic head slider 8 (hereinafter simply referred to as a head slider 8) including a head element on a substrate is mounted on one end of the magnetic head assembly 2. Each magnetic head assembly 2 is located so that an air bearing surface of the head slider 8 may face the surface of the disk 1. The air bearing surface means the surface of the head slider 8 facing the disk 1.

This magnetic disk apparatus is also provided with a driving section 7 for positioning the head slider 8 on a track of the disk 1, the driving section 7 being disposed on the other end, i.e., the rear end of the magnetic head assembly 2. The driving section 7 includes a voice coil motor using an interaction with a magnetic field generated by a coil (described below) disposed on the rear end of the magnetic head assembly 2, or the like, so that the driving section 7 can swing the magnetic head assembly 2 around the fixed pivot 5. Thus, the head slider 8 can be moved in a radial direction of the disk 1. Here, the disk 1 corresponds to one specific example of "the recording medium" of the present invention. The head slider 8 corresponds to one specific example of "the head slider" of the present invention. The magnetic head assembly 2 corresponds to one specific example of"the head assembly" of the present invention.

Figure 1:
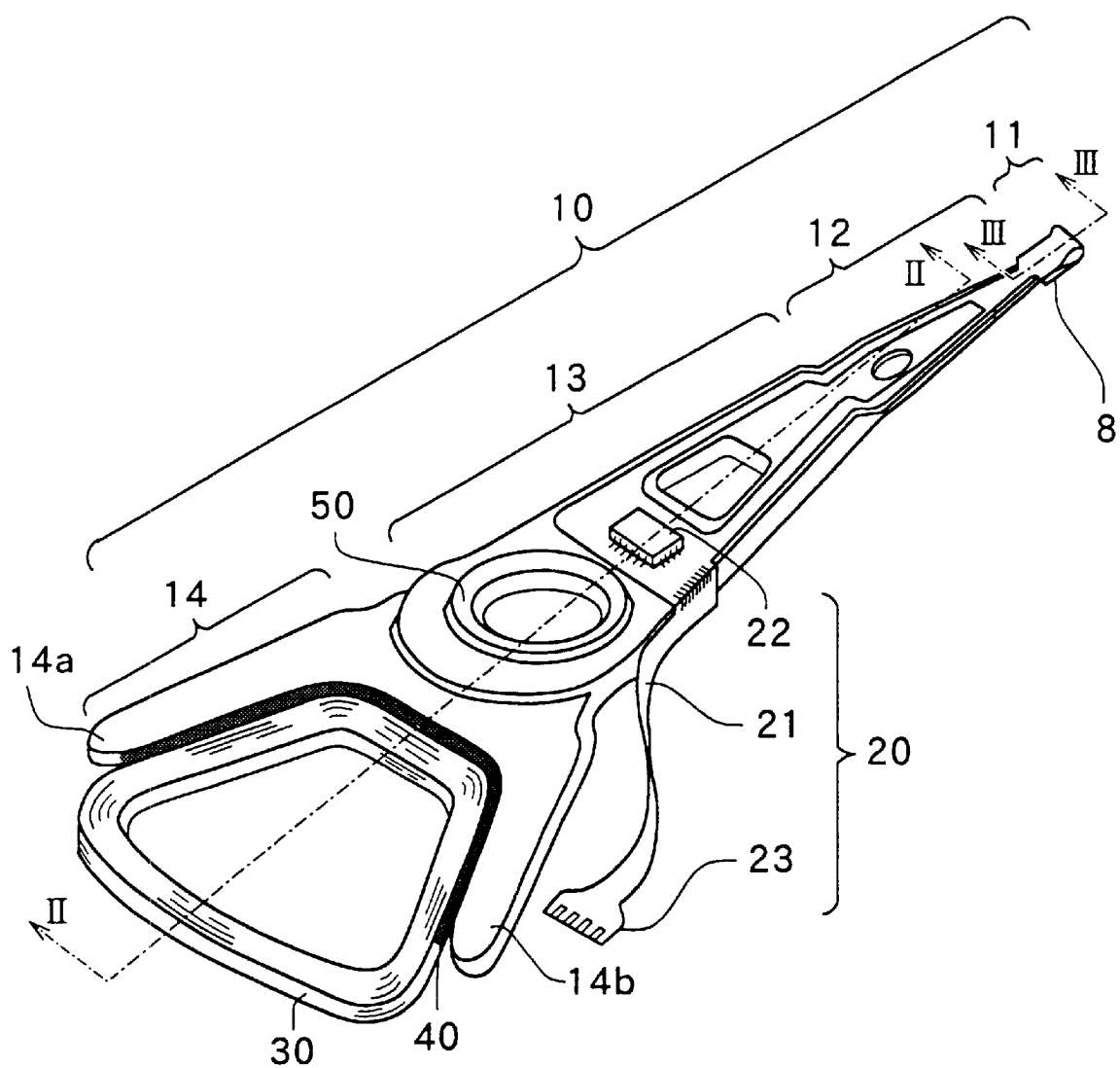
FIG. 1 is a perspective view of an external constitution of a magnetic head assembly according to one embodiment of the present invention.
Figure 2:
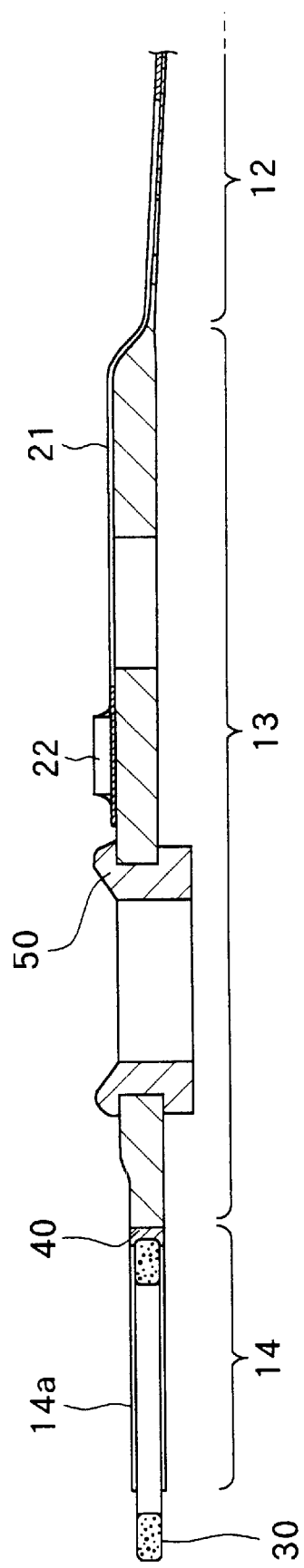
FIG. 2 is a cross sectional view taken along line II—II of FIG. 1.
Figure 3:
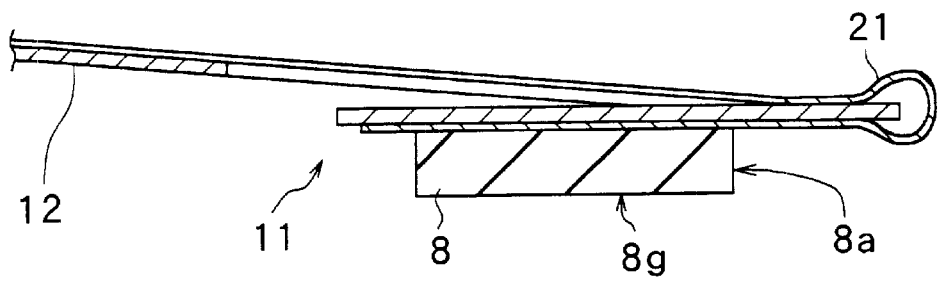
FIG. 3 is a cross sectional view taken along line III—III of FIG. 1.
Figure 4:
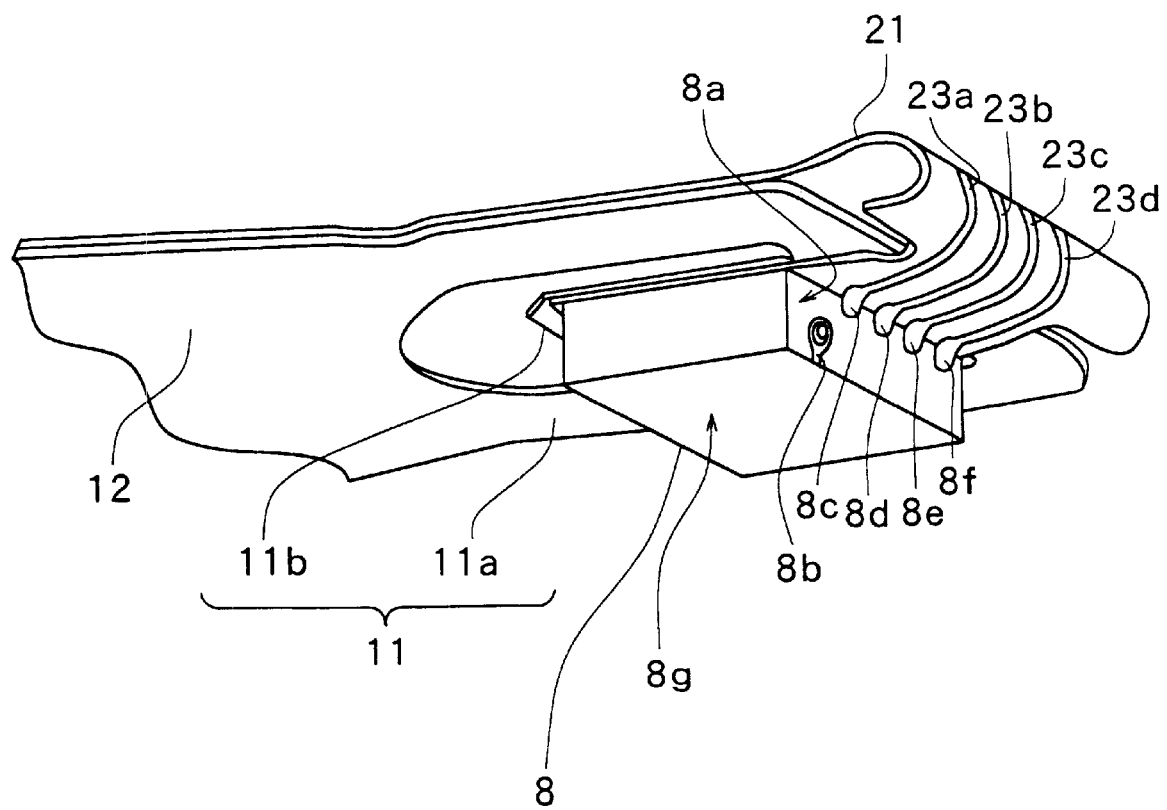
FIG. 4 is a perspective view of the external constitution of a head slider of the magnetic head assembly shown in FIG. 1 and a peripheral portion of the head slider.

FIGS. 1 to 4 show the constitution of the head assembly according to the first embodiment of the present invention. Specifically, these drawings show the constitution of the magnetic head assembly 2 of the magnetic disk apparatus shown ,in FIG. 5. Since the head slider suspension according to one embodiment of the present invention is embodied by the head assembly according to this embodiment, the head slider suspension will be described below in conjunction with the head assembly. FIG. 1 is a perspective view of the magnetic head assembly 2 seen from the side opposite to the air bearing surface. FIG. 2 is a cross sectional view taken along line II—II of FIG. 1. FIG. 3 is a cross sectional view taken along line III—III of FIG. 1. FIG. 4 shows the head slider 8 of the magnetic head assembly 2 shown in FIG. 1 and a peripheral portion of the head slider 8, seen from the side of the air bearing surface.

As shown in FIGS. 1 and 2, the magnetic head assembly 2 comprises the head slider 8, a head slider suspension 10 for supporting the head slider 8, and a wiring unit 20 and a coil 30 attached to the head slider suspension 10. The head slider suspension 10 comprises a slider support section 11 having a: gimbal structure for floatably supporting the head slider 8, a suspension section 12 for supporting the slider support section 11, an arm section 13 for supporting the suspension section 12, and a coil support section 14 for supporting the coil 30. The slider support section 11, the suspension section 12, the arm section 13 and the coil support section 14 constitute a part of a continuous structure including no joint area. That is, these sections are integrally formed in such a state that they have no seam among them. As described below, such a continuous structure is formed of a metallic material such as aluminum or stainless steel, or an organic resin material, for example. Here, the slider support section 11 corresponds to one specific example of "the slider support section" of the present invention. The suspension section 12 corresponds to one specific example of "the suspension section" of the present invention. The arm section 13 corresponds to one specific example of "the arm section" of the present invention.

The suspension section 12 has fixed flexibility so that the suspension section 12 can flexibly support the slider support section 11. The arm section 13 functions as a rigid support member. A part of the arm section 13 has a connect section 50 into which the fixed pivot 5 (FIG. 5) is to be inserted through the bearing 6. The connect section 50 has a thrust thickness (a thickness in an axial direction) required to surely (not loosely and obliquely) connect the fixed pivot 5 to the arm section 13 through the bearing 6. Here, the connect section 50 corresponds to one specific example of "the connect section" of the present invention.

The wiring unit 20 is called FOS (FLEX ON SUSPENSION). The wiring unit 20 has a flexible wiring pattern film 21, an IC chip 22 located on the wiring pattern film 21, and a terminal 23 disposed on one end of the wiring pattern film 21. The wiring pattern film 21 includes a wiring pattern (not shown in FIG. 1) made of a conductive material and coating films made of an insulating material (e.g., the organic resin material such as polyimide), the coating films sandwiching the wiring pattern. The wiring pattern film 21 is stuck on the surface of the head slider suspension 10 with an adhesive. or the like. Preferably, the wiring pattern is a metal thin film pattern made of, for example, copper (Cu) or gold (Au). Further, the wiring pattern may be composed by copper layer and gold layer stacked. The IC chip 22 is used to generate a recording current to a magnetic head element (not shown in FIG. 1) of the head slider 8, to amplify a reproduction signal and to switch between recording and reproduction, or the like. Preferably, the IC chip 22 is located as close as possible to the head slider 8. The IC chip 22 includes many external terminals connected to the wiring pattern through pads on the wiring pattern film 21. The terminal 23 is connected to a control circuit not shown. Here, the wiring pattern film 21 corresponds to one specific example of "the wiring pattern" of the present invention. The IC chip 22 corresponds to "an integrated circuit chip" of the present invention.

The coil support section 14 extends from the rear end of the arm section 13 substantially rearward (in the direction opposite to the head slider 8). The coil support section 14 includes two support pieces 14a and 14b integrated with the arm section 13. The coil 30 is fixedly bonded to the support pieces 14a and 14b with an adhesive 40 in such a manner that the coil 30 is sandwiched between the two support pieces 14a and 14b. The coil 30 has a function of generating the magnetic field by the current flowing through the coil 30. The coil 30 is formed of a copper wire or the like, for example.

As shown in FIGS. 3 and 4, the slider support section 11 has a gimbal support section 11a integrated with the suspension section 12, and a gimbal section 11b integrated with the gimbal support section 11a and capable of being freely moved relative to the gimbal support section 11a. The wiring pattern film 21 extends on an upper surface of the suspension section 12 (the surface opposite to the surface facing the disk 1). One end of the wiring pattern film 21 extends from the suspension section 12 to the upper surface of the gimbal support section 11a and further extends around the end of the gimbal support section 11a to the rear surface thereof (the surface facing the disk 1). The wiring pattern film 21 further extends onto the gimbal section 11b and covers the surface of the gimbal section 11b. The head slider 8 is disposed on the rear surface of the gimbal section 11b with the wiring pattern film 21 in between.

The head slider 8 is substantially a rectangular parallelepiped. The head slider 8 is fixedly bonded to the wiring pattern film 21 with the adhesive or the like. A magnetic head element 8b and bonding pads 8c–8f for inputting and outputting the signal are formed on an element-formed surface 8a which is one side end surface of the head slider 8. The bonding pads 8c to 8f are electrically connected to wiring patterns 23a to 23d of the wiring pattern film 21, respectively, by a gold ball or the like, for example. The magnetic head element 8b includes a write inductive magnetic transducer and/or a read magneto resistive element (MR element), for example. An air bearing surface 8g of the head slider 8 faces the surface of the disk 1 (FIG. 5).

Next, a function of the magnetic head assembly having the above constitution and the magnetic disk apparatus comprising the magnetic head assembly will be described.

The magnetic disk apparatus shown in FIG. 5 records and reproduces information on/from the disk 1 by using the method called the CSS (Contact-Start-Stop) method. That is, when the disk 1 is not rotated, the head slider 8 is in contact with the disk 1 due to a pressing force applied by the suspension section 12 of the magnetic head assembly 2. When the disk 1 is rotated, an air flow is generated between the head slider 8 and the disk 1 and thus lift is generated. Thus, the head slider 8 is separated and levitated from the surface of the disk 1, and a slight distance is kept between the head slider 8 and the disk 1 by a balance between the lift and the pressing force applied by the suspension section 12. At this time, the current is allowed to flow through the coil 30 supported by the coil support section 14 of the magnetic head assembly 2, whereby the whole magnetic head assembly 2 is swung around the fixed pivot 5. Thus, the head slider 8 on the end of the magnetic head assembly 2 is moved in the substantially radial direction of the disk 1, in a state of flying off the surface of the disk 1. The head slider 8 is moved relatively to the disk 1, thereby recording and reproducing the information on/from the magnetic disk 1.

As described above, according to this embodiment, components of the head slider suspension, i.e., the slider support section 11, the suspension section 12, the arm section 13 and the coil support section 14 constitute a part of the continuous structure including no joint area. This results in a reduction in the number of components, thereby making it possible to improve efficiency in design, manufacturing and component control.

Moreover, according to this embodiment, each individual head assembly comprises the head slider 8, the section for supporting the head slider 8 and the section for moving the head slider 8. This results in an increase in a degree of freedom for manufacturing the magnetic disk apparatus, thereby making it possible to produce a small quantity of many types at low cost, as described below.

Moreover, according to this embodiment, the IC chip 22 is mounted on each magnetic head assembly 2 so as to minimize the distance between the head slider 8 and the IC chip 22. This permits the increase in a data transfer rate and the reduction in a rise time of the recording current. Also, a recording frequency at a higher-frequency band would cause less deterioration in NLTS (Non-Linear Transition Shift). This enables the highly reliable magnetic recording. NLTS expresses, as a percentage, an amount of shift of an actual magnetic recording position from an ideal magnetic recording position on the disk.

Examples of Application of the Head Assembly According to this Embodiment to the Magnetic Disk Apparatus Some examples of the constitution for manufacturing the magnetic disk apparatus by using the head assembly of this embodiment will be described with reference to FIGS. 6 to 10. All of FIGS. 6 to 10 are cross sectional views of the state in which the magnetic head assembly 2 is attached to the fixed pivot 5 through the bearing 6. For the sake of convenience, an overall length of the magnetic head assembly 2 in these drawings is reduced compared to that of the magnetic head assembly 2 in FIG. 1 or the like, and the details are omitted.

Figure 6:
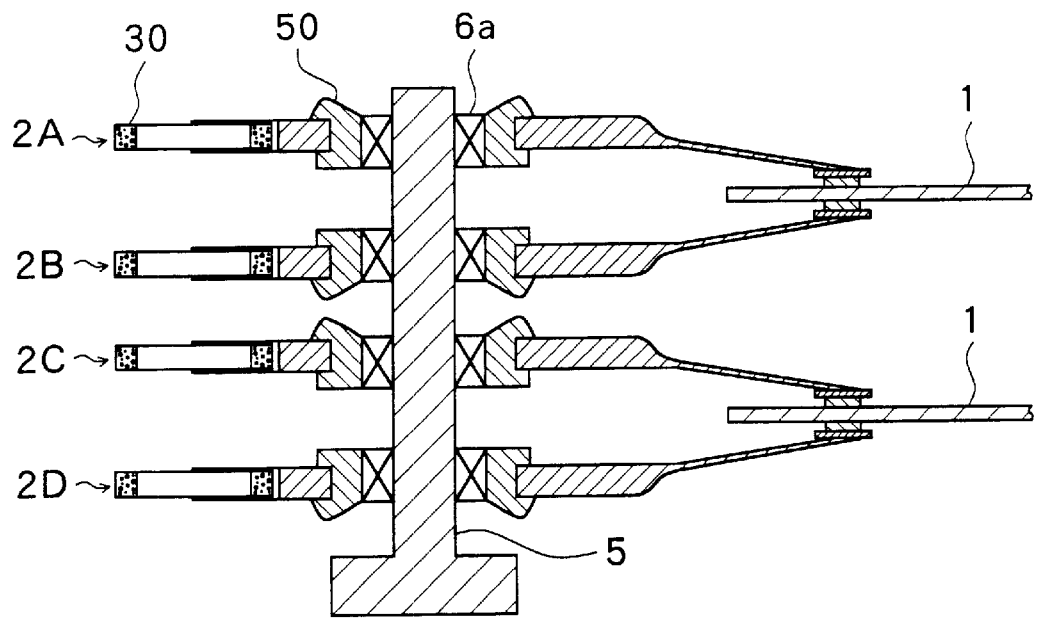
FIG. 6 is a cross sectional view of one example of the constitution for manufacturing the magnetic disk apparatus by using the head assembly of the embodiment.

In FIG. 6, a pair of magnetic head assemblies 2A and 2B is located in such a manner that the disk 1 whose surfaces are recordable is sandwiched between the magnetic head assemblies 2A and 2B, and each of the magnetic head assemblies 2A and 2B is independently attached to the fixed pivot 5 through a bearing 6a having a short thrust length. Another pair of magnetic head assemblies 2C and 2D is located in the same manner as the pair of magnetic head assemblies 2A and 2B. All of the magnetic head assemblies 2A–2D have the same structure as the magnetic head assembly 2 shown in FIGS. 1 to 4 has.

In this example, the magnetic head assemblies 2A to 2D can be swung around the fixed pivot 5 independently of (separately from) one another. Thus, each head slider 8 can be uniquely moved by individually controlling a supply of the current to the coil 30 of these magnetic head assemblies. When this example is compared to the above embodiment (FIG. 5) in which all the magnetic head assemblies 2 are integrally swung and thus all the head sliders 8 must make the same movement, this example is therefore superior to the above embodiment in that each head slider 8 is not uselessly moved and thus data can be efficiently recorded on and reproduced from the disk 1. Moreover, only the magnetic head assembly for one of a plurality of disk surfaces to be actually accessed can be swung, and thus unnecessary power consumption can be reduced.

Figure 7:
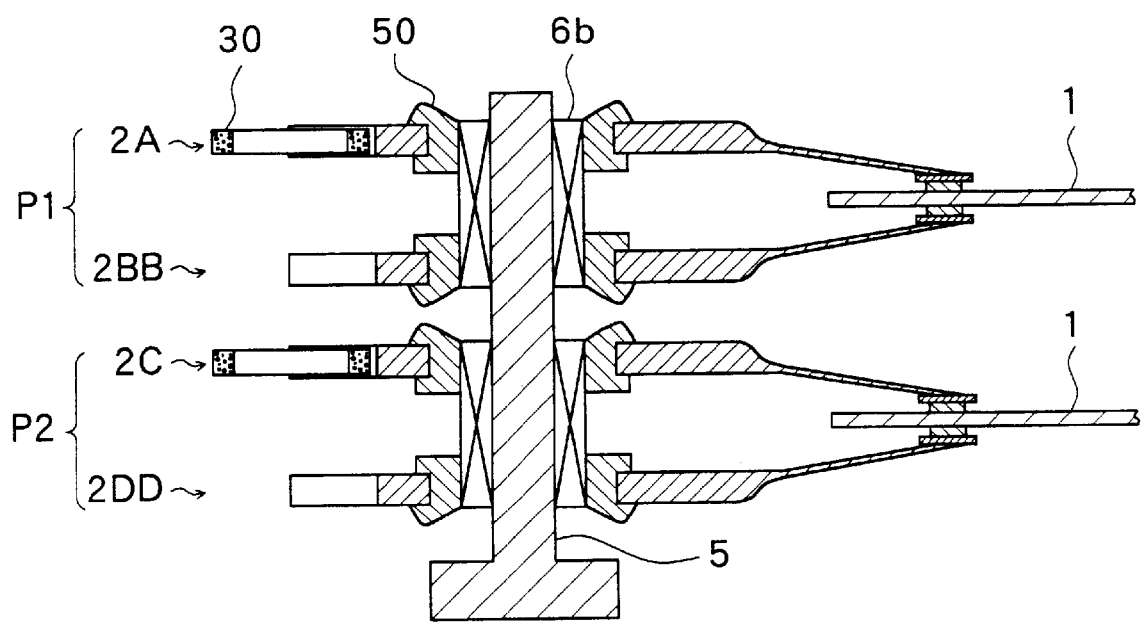
FIG. 7 is a cross sectional view of another example of the constitution for manufacturing the magnetic disk apparatus by using the head assembly of the embodiment.

In FIG. 7, a pair P1 of magnetic head assemblies 2A and 2BB is located in such a manner that the disk 1 whose surfaces are recordable is sandwiched between the magnetic head assemblies 2A and 2BB, and each of the magnetic head assemblies 2A and 2BB is attached to the fixed pivot 5 through a common bearing 6*b* having a slightly long thrust length. A pair P2 of magnetic head assemblies 2C and 2DD is located in the same manner as a pair P1 of magnetic head assemblies 2A and 2BB. The magnetic head assemblies 2A and 2C have the same structure as the magnetic head assembly 2 shown in FIGS. 1 to 4 has. The magnetic head assemblies 2BB and 2DD have the structure which is obtained by eliminating the respective coils 30 from the magnetic head assemblies 2A and 2C.

In this example, a pair P1 of magnetic head assemblies can be integrally swung around the fixed pivot 5 independently of another pair P2 of magnetic head assemblies. That is, each pair of magnetic head assemblies for each disk 1 can be independently moved. Moreover, as shown in the drawing, the coil 30 is attached to just one of each pair of magnetic head assemblies. Consequently, the number of components for use can be reduced.

Figure 8:
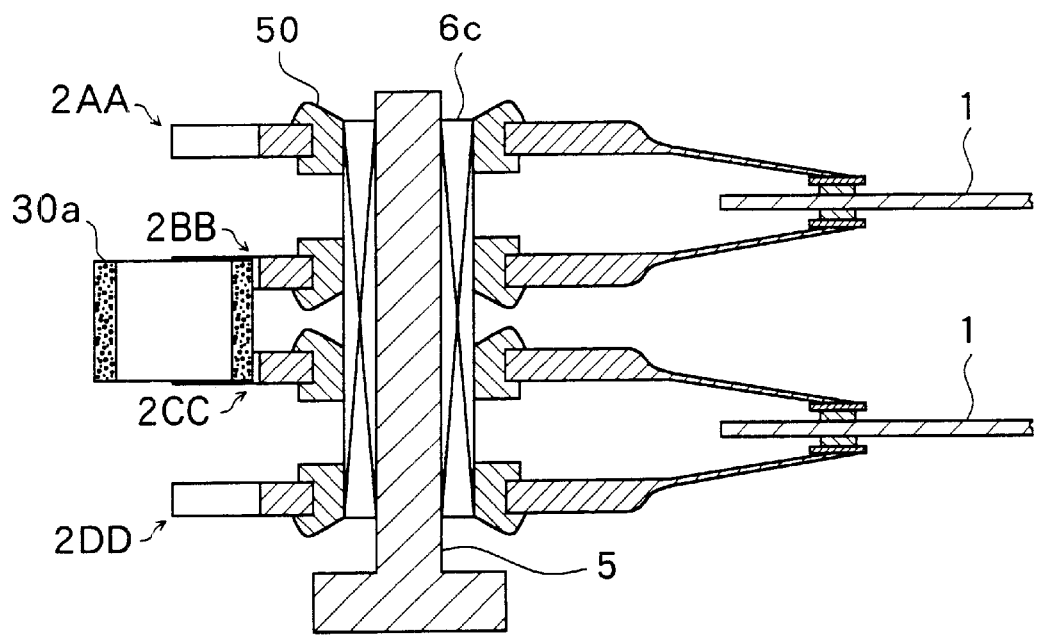
FIG. 8 is a cross sectional view of still another example of the constitution for manufacturing the magnetic disk apparatus by using the head assembly of the embodiment.

In FIG. 8, a pair of magnetic head assemblies 2AA and 2BB and a pair of magnetic head assemblies 2CC and 2DD are located in such a manner that the one disk 1 whose surfaces are recordable is sandwiched between the magnetic head assemblies 2AA and 2BB and the other disk 1 whose surfaces are recordable is sandwiched between the magnetic head assemblies 2CC and 2DD. All the magnetic head assemblies 2AA to 2DD are attached to the fixed pivot 5 through a common bearing 6*c* having a long thrust length. All of the magnetic head assemblies 2AA to 2DD have the structure which is obtained by eliminating the coil 30 from the magnetic head assembly 2 shown in FIGS. 1 to 4.

In this example, all the magnetic head assemblies 2AA to 2DD are integrally swung around the fixed pivot 5. Accordingly, these magnetic head assemblies can be moved in the same manner as the conventional integral-type magnetic head assembly having a plurality of head sliders 8. In this example, basically, the coil 30 is attached to any one magnetic head assembly 2. To ensure a sufficient driving force, one coil 30*a* of great width may be attached to the coil support sections 14 of two magnetic head assemblies 2 in such a manner that the coil 30*a* extends over the coil support sections 14 as shown in FIG. 8, for example.

Figure 9:
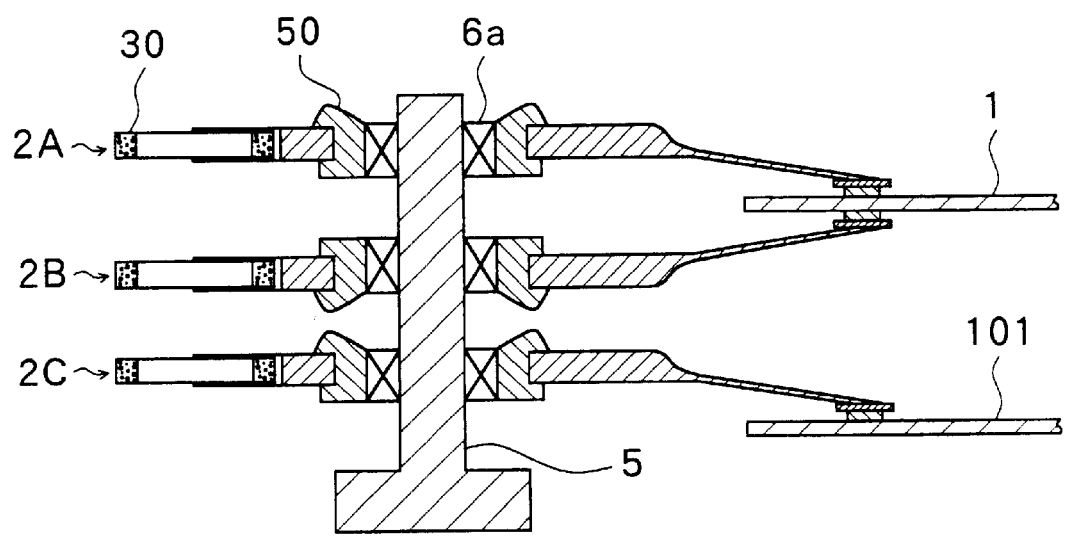
FIG. 9 is a cross sectional view of a further example of the constitution for manufacturing the magnetic disk apparatus by using the head assembly of the embodiment.

All the above constitutions of FIGS. 6 to 8 are based on the assumption that a double-sided disk is used. However, the magnetic head assembly 2 of this embodiment is flexibly applicable to the magnetic disk apparatus having the double-sided disk and a single-sided disk as shown in FIG. 9, for example. In the example shown in this drawing, a pair of magnetic head assemblies 2A and 2B is located for the disk 1 whose surfaces are recordable, and only one magnetic head assembly 2C is located for a disk 101 having only one recordable surface. In the example of this drawing, the magnetic head assemblies 2A to 2C are individually attached to the fixed pivot 5 through the bearing 6 having a short thrust length so that each magnetic head assembly is independently swung. As shown in FIG. 7 or 8, two or more magnetic head assemblies 2 may be integrated and attached to the fixed pivot 5 through the bearing having a long thrust length.

Figure 10:
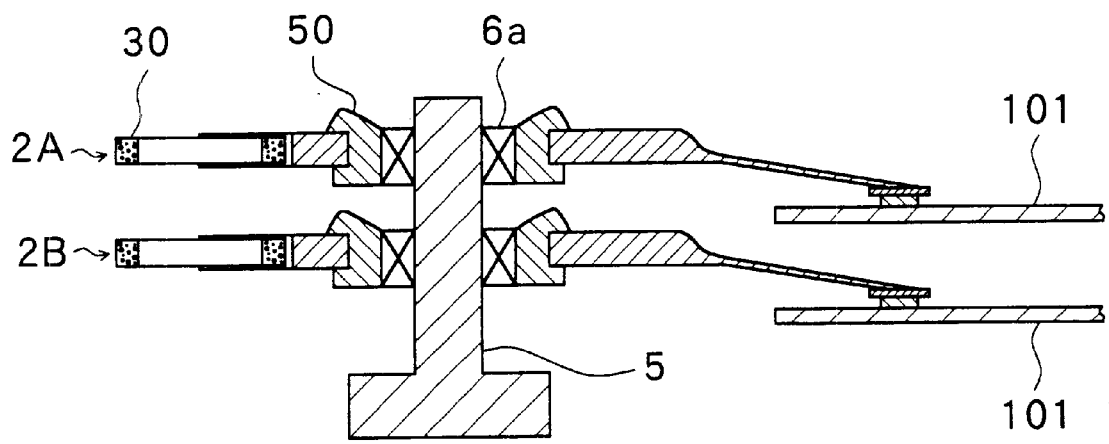
FIG. 10 is a cross sectional view of a further example of the constitution for manufacturing the magnetic disk apparatus by using the head assembly of the embodiment.

Alternatively, as shown in FIG. 10, one magnetic head assembly 2A (or 2B) can be located for one recording surface of the disk 101 in case of the magnetic disk apparatus using only the disk 101 whose one surface is recordable. Also in this case, as shown in the drawing, each magnetic head assembly may be independently swung, or all the magnetic head assemblies may be integrally swung by using the bearing having a long thrust length.

Although the magnetic disk apparatus having two disks has been described in any of the above examples of FIGS. 6 to 10, the magnetic head assembly of this embodiment is, of course, also applicable to the magnetic disk apparatus containing two or more disks. The number of magnetic head assemblies 2 can be increased in accordance with the number of disks (the number of recordable surfaces to be exact).

Figure 11:
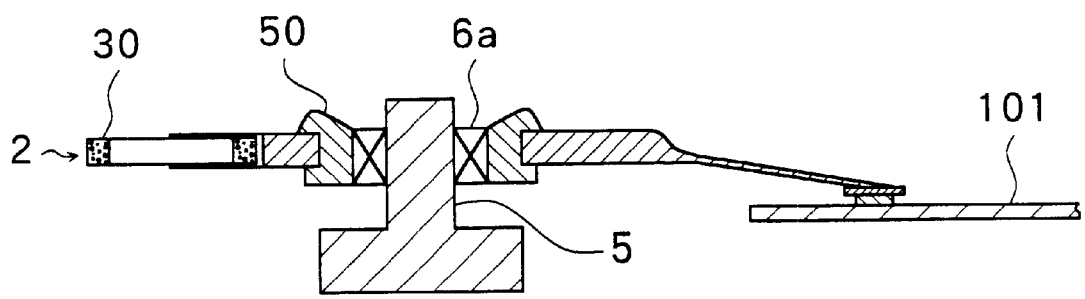
FIG. 11 is a cross sectional view of a further example of the constitution for manufacturing the magnetic disk apparatus by using the head assembly of the embodiment.

On the contrary, the magnetic head assembly 2 of this embodiment is also applicable to the magnetic disk apparatus having the simplest constitution with only one disk 101 and only one magnetic head assembly 2 as shown in FIG. 11, for example. The magnetic disk apparatus having such a constitution is particularly suitable for applications which a small storage capacity is sufficient for. Thus, the low-cost magnetic disk apparatus is made feasible.

As described above, according to the head assembly according to this embodiment, only one type of magnetic head assembly 2 can adapt to any change in the type and number of disks contained in the magnetic head assembly 2. Thus, the head assembly of this embodiment can sufficiently meet a, demand for production of a small quantity of many types without increasing the cost.

Method of Manufacturing the Head Assembly of this Embodiment

Next, the method of manufacturing the head assembly (FIG. 1) according to this embodiment will be described with reference to FIGS. 11 to 14. Since the method of manufacturing the head slider suspension according to this embodiment is embodied by the method of manufacturing the head assembly according to this embodiment, the former method will be described below in conjunction with the latter method.

In the method of manufacturing the magnetic head assembly of this embodiment, the magnetic head element including the writing (recording) inductive magnetic transducer and the reading (reproducing) magneto resistive element is first formed on the substrate composed of altic ($Al_2O_3$, TiC) by the process of forming a thin film by using a photolithography technique. Then, the head slider 8 shown in FIGS. 3 and 4 is formed through, the process of polishing the air bearing surface 8*g*, the process of dividing the element by machining, and so on. A protective film such as DLC (Diamond-Like Carbon) may be formed on the air bearing surface 8*g*.

Figure 12:
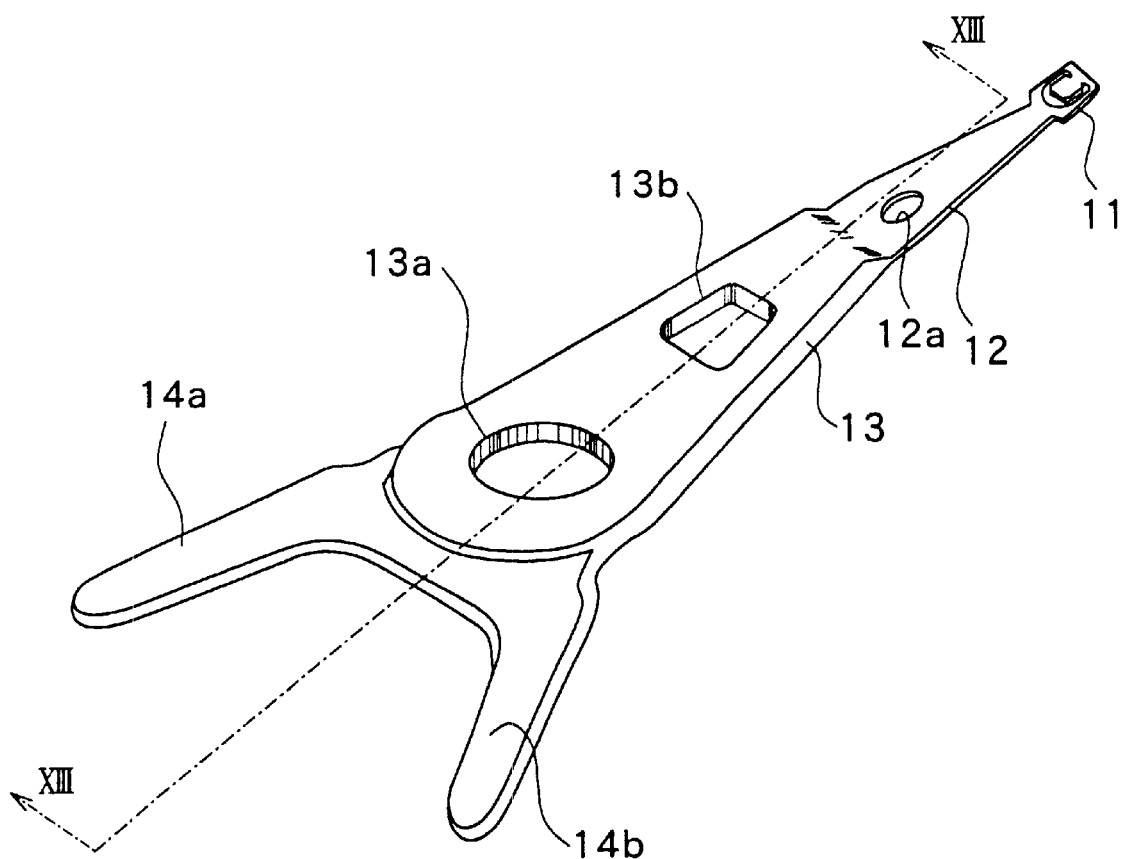
FIG. 12 is a perspective view of the external constitution of a head slider suspension manufactured by a method of manufacturing the head assembly of the embodiment.
Figure 13:
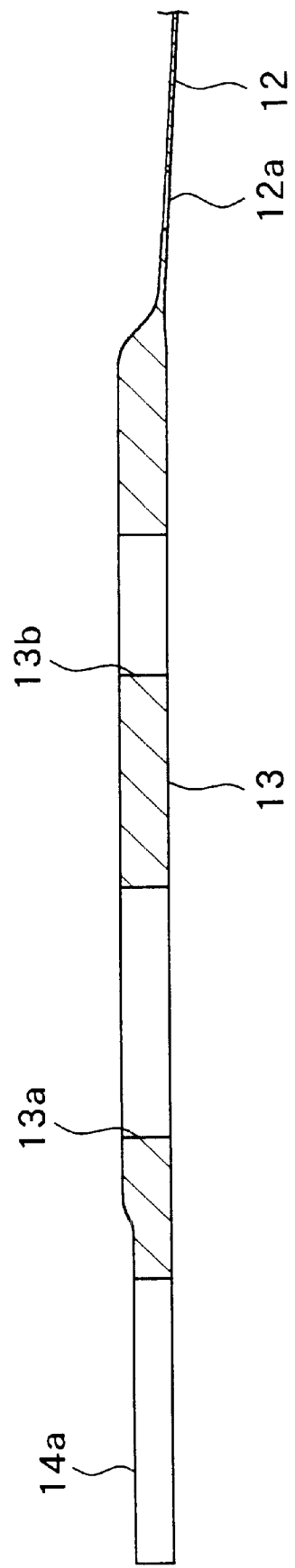
FIG. 13 is a cross sectional view taken along line XIII—XIII of FIG. 12.

As shown in FIGS. 12 and 13, the head slider suspension 10 as the continuous structure including the slider support section 11, the suspension section 12, the arm section 13 and the coil support section 14 is formed. FIG. 12 is a perspective view of the head slider suspension 10 seen from the side opposite to the surface facing the disk. FIG. 13 is a cross sectional view taken along line XIII—XIII of FIG. 12.

The head slider suspension 10 is formed in the following manner. First, a plate material of a uniform thickness is embossed by using a predetermined press so that the areas to be the slider support section 11, the suspension section 12, the arm section 13 and the coil support section 14 have predetermined thickness. For example, the aluminum, the stainless steel or the like is used as the plate material. In this case, the arm section 13 and the coil support section 14 have such a thickness that they can exhibit sufficient rigidity. The suspension section 12 and the slider support section 11 have such a thickness that they can exhibit necessary flexibility. Then, die cutting is applied to the material by using a cutting die having a shape corresponding to an outer shape (a contour) of the head slider suspension 10, whereby the head slider suspension 10 is obtained. Concurrently with the die cutting, openings 13a and 13b of the arm section 13 and an opening 12a of the suspension section 12 are formed, and a separation opening is formed between the gimbal support section 11a and the gimbal section 11b in the gimbal support section 11a so that the gimbal section 11b is floatably supported by the gimbal support section 11a. Then, the head slider suspension 10 is press-embossed so that the suspension section 12 may form a predetermined angle to the arm section 13 and the gimbal section 11b may form a predetermined angle to the gimbal support section 11a.

Figure 14:
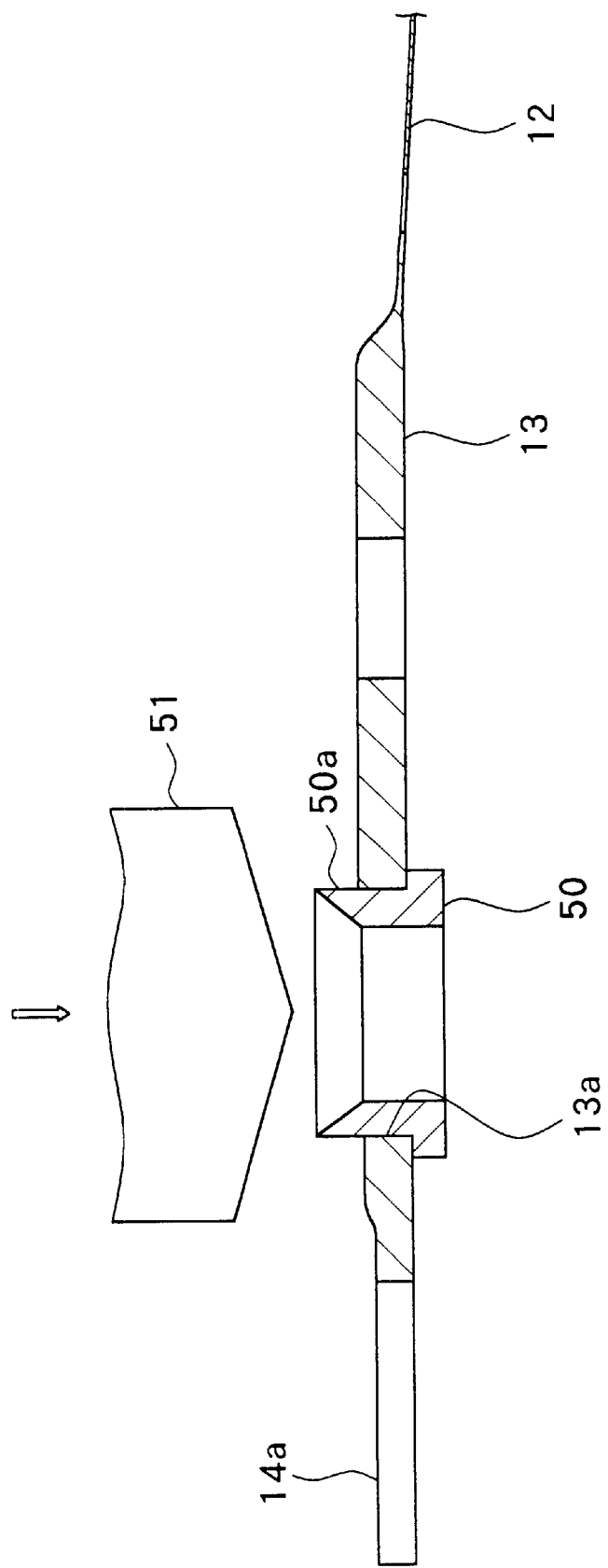
FIG. 14 is a cross sectional view of one step of the method of manufacturing the head assembly of the embodiment.
Figure 15:
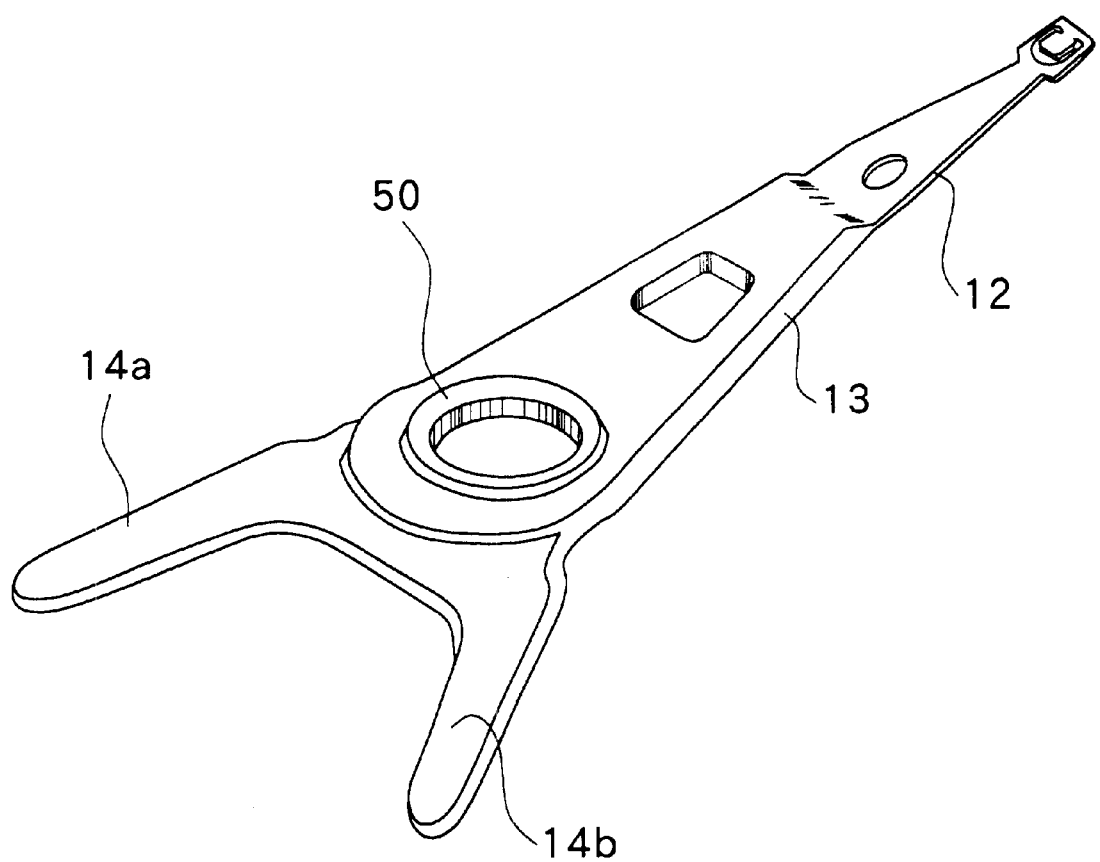
FIG. 15 is a perspective view of one step of the method of manufacturing the head assembly of the embodiment.

Next, as shown in FIG. 14, the ring-shaped connect section 50 separately formed is inserted into the opening 13a of the arm section 13 of the head slider suspension 10. Then, a circular end 50a of the connect section 50 is outward crushed by use of a conical jig 51 having a top angle close to 180° for example so that the connect section 50 is fixedly crimped to the arm section 13. As shown in FIG. 15, the head slider suspension 10 having the connect section 50 is thus completed.

Then, the wiring unit 20 previously made is stuck with the adhesive on the area extending from the surface of the arm section 13, the suspension section 12 and the slider support section 11 of the head slider suspension 10 to the rear surface of the gimbal section 11b of the slider support section 11. For example, an ultraviolet-curing resin or a thermosetting resin is used as the adhesive. In this case, the wiring pattern film 21 of the wiring unit 20 extends in such a manner that the wiring pattern film 21 is not bent and draws a small curved surface at a portion from the surface of the gimbal support section 11a of the slider support section 11 to the rear surface of the gimbal section 11b.

Then, the head slider 8 is positioned and placed on the wiring pattern film 21 covering the rear surface of the gimbal section 11b, and the head slider 8 is fixedly bonded to the wiring pattern film 21 with the adhesive or the like. Preferably, the ultraviolet-curing or thermosetting resin adhesive is used in the same manner as the above description. The adhesive may be applied to either the head slider 8 or the gimbal section 11b or both of the head slider 8 and the gimbal section 11b.

Then, the bonding pads 8c to 8f of the head slider 8 are connected to the wiring patterns 23a to 23d of the wiring pattern film 21, respectively, by bonding using the gold ball. Then, the ultraviolet-curing resin (UV resin) may be applied and cured by ultraviolet-light irradiation and heating in order to protect a ball bonding portion, as needed.

Then, as shown in FIG. 1, the coil 30 is bonded to the coil support section 14 of the head slider suspension 10 with the adhesive 40. The ultraviolet-curing or: thermosetting resin adhesive is used as the adhesive 40 in the same manner as the above description. The magnetic head assembly 2 shown in FIG. 1 is thus completed.

According to the method of manufacturing the head assembly of this embodiment, the head slider suspension 10 as the continuous structure integrally including all of the slider support section 11, the suspension section 12, the arm section 13 and the coil support section 14 is formed only by a series of pressing, i.e., embossing, then die cutting and then embossing the plate material as a base. Thus, a manufacturing process can be greatly simplified, compared to the manufacturing process of the case where the arm section and the suspension section are separately formed and then they are connected to each other.

Although the aluminum, the stainless steel or the like is used as the plate material in this embodiment, other metallic materials can be used. Besides, not the metallic material but an organic synthetic resin material having excellent heat resistance, impact resistance and insulating properties, such as polytetrafluoroethylene (a trade name: Teflon) may be used as the plate material.

Although the connect section 50 is made separately from the head slider suspension 10 and then the connect section 50 is fixedly bonded to the head slider suspension 10 in this embodiment, this process is not always necessary. For example, the following process may take place. Concurrently with the above-mentioned press-embossing process or in drawing process separate from the press-embossing process, the opening 13a is drawn, whereby the thrust thickness is increased so as to ensure the thickness required to surely (not loosely and obliquely) receive the bearing 6.

Although the head slider suspension 10 forming the continuous structure is obtained by pressing one plate material of a uniform thickness in the manufacturing method of this embodiment, the head slider suspension can be formed in casting process using a casting mold or resin molding process using a mold, for example. This method can be accomplished in the following manner. For example, the mold having a cavity with a shape corresponding to the outer shape of the head slider 5 suspension 10 as the continuous structure is formed. Then, the cavity of the mold is filled with a predetermined material (a molten metal, a molten resin, etc.), and then the material is solidified. When this method is adopted, the connect section 50 can be integrally simultaneously molded Second Embodiment Next, the second embodiment of the present invention will be described.

Figure 16:
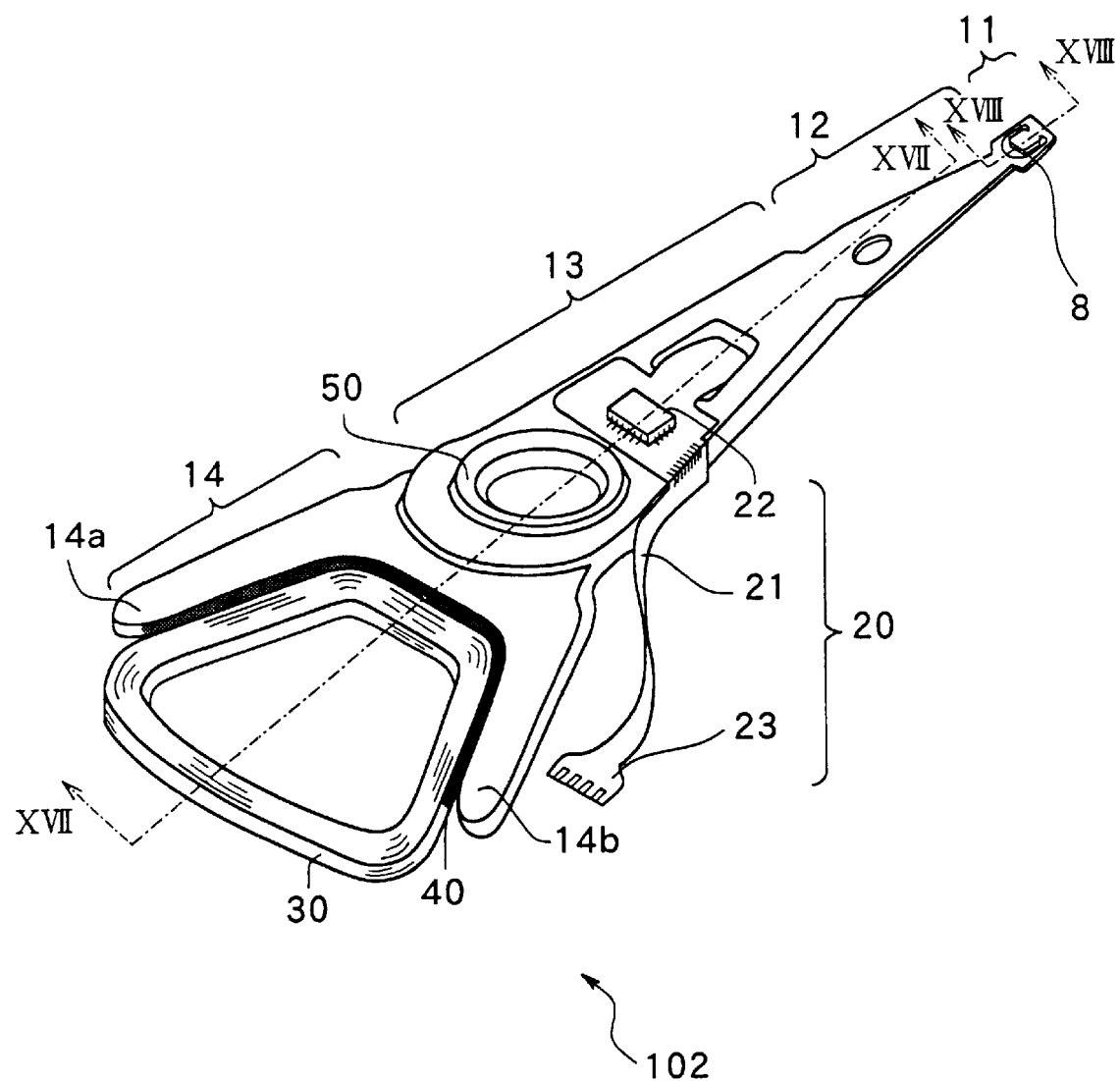
FIG. 16 is a perspective view of the external constitution of the magnetic head assembly according to another embodiment of the present invention.
Figure 17:
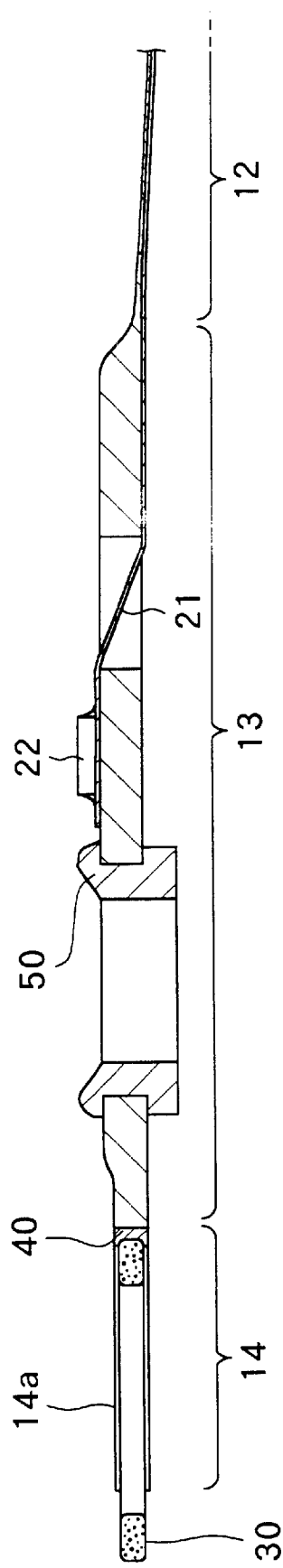
FIG. 17 is a cross sectional view taken along line XVII—XVII of FIG. 16.
Figure 18:
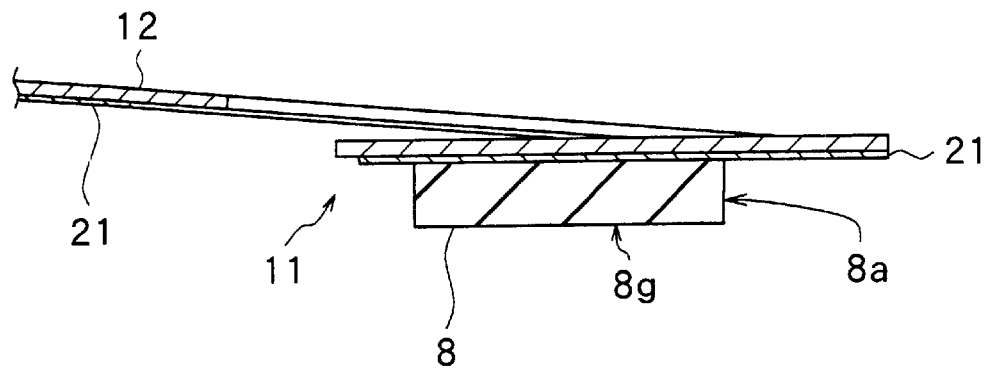
FIG. 18 is a, cross sectional view taken along line XVIII—XVIII of FIG. 16.
Figure 19:
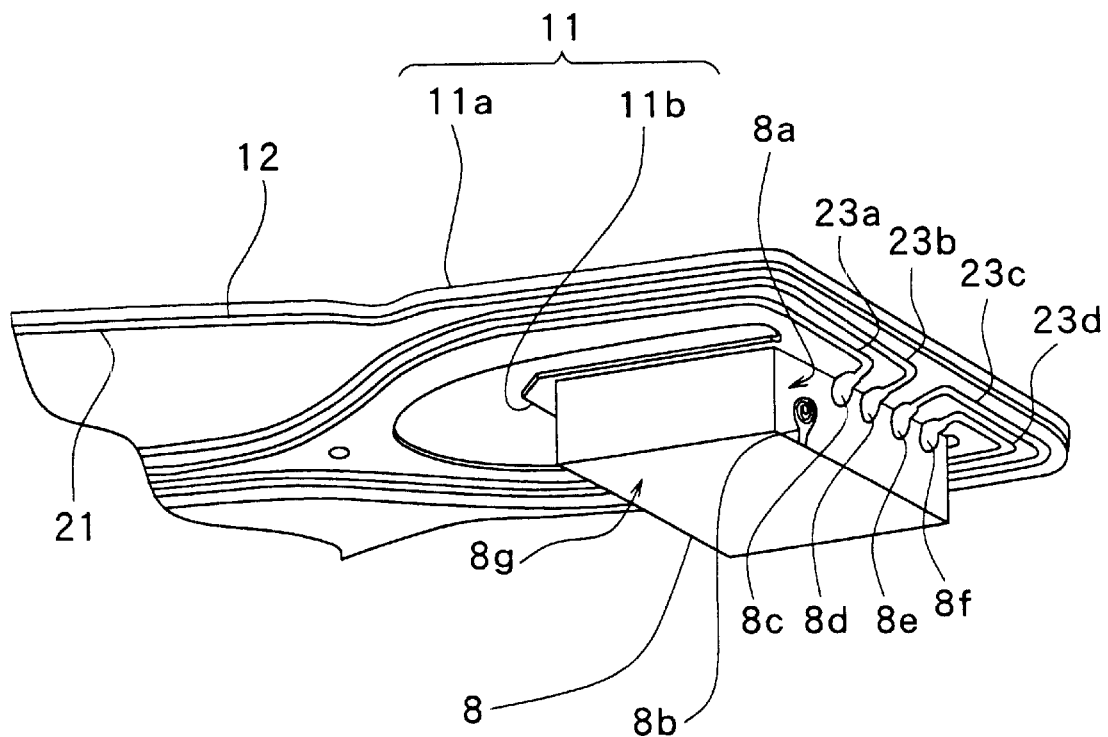
FIG. 19 is a perspective view of the external constitution of the head slider of the magnetic head assembly shown in FIG. 16 and the peripheral portion of the head slider.

FIGS. 16 to 19 show the constitution of the head assembly according to the second embodiment of the present invention. Since the head slider suspension according to the second embodiment of the present invention is embodied by the head assembly according to this embodiment, the head slider suspension will be described below in conjunction with the head assembly. FIG. 16 is a perspective view of a magnetic head assembly 102 seen from the side opposite to the air bearing surface. FIG. 17 is a cross sectional view taken along line XVII—XVII of FIG. 16. FIG. 18 is a cross sectional view taken along line XVIII—XVIII of FIG. 16. FIG. 19 shows the head slider 8 of the magnetic head assembly 102 shown in FIG. 16 and the peripheral portion of the head slider 8 seen from the side of the air bearing surface. In these drawings, the same elements as the elements shown in FIGS. 1 to 4 have the same reference numerals, and the description is appropriately omitted.

The head assembly of this embodiment differs from the head assembly of the first embodiment in a route which the wiring pattern film 21 extends along. That is, in this embodiment, as shown in FIGS. 16 and 17, the portion on which the IC chip 22 is located in the wiring unit 20 extends on the topside face of the arm section 13, while the portion forward of the portion on which the IC chip 22 is located (closer to the head slider 8) extends from the topside face (the face shown in FIG. 16) of the arm section 13 through the opening 13b to the underside face (the face not shown in FIG. 16) of the arm section 13. The wiring pattern film 21 extends from the underside-face of the arm section 13 to the underside face of the suspension section 12. As shown in FIGS. 18 and 19, the wiring pattern film 21 further extends to the gimbal support section 11a and the gimbal section 11b of the slider support section 11, and finally the wiring pattern film 21 covers the gimbal section 11b. The head slider 8 is located on the wiring pattern film 21 covering the gimbal section 11b. The remaining constitution is the same as the constitution of the first embodiment. Here, the opening 13b corresponds to one specific example of "a communication hole" of the present invention.

According to the head assembly of this embodiment, the wiring pattern film 21 extends on the head slider suspension 10 without strain. Therefore, the wiring pattern is less broken, and thus the wiring pattern is highly reliable. In the manufacturing, the wiring pattern film 21 is disposed with relative ease.

Although the present invention has been described above by exemplifying some embodiments, the present invention is not limited to these embodiments and various modifications are possible. For example, in the above embodiments, the wiring unit 20 is disposed so that the IC chip 22 may be located on the topside face of the head slider suspension 10 (the side opposite to the surface facing the disk). On the contrary, the wiring unit 20 may be, however, disposed so that the IC chip 22 may be located on the underside face of the head slider suspension 10 (the side of the surface facing the disk). This case is excellent in an effect of cooling the IC chip 22 because the IC chip 22 is exposed directly to the air flow generated by rotation of the disk 1.

Although the head assembly has been described as the magnetic head assembly in the embodiments, the present invention is applicable to other recording and reproducing apparatuses, e.g., a magneto-optical head assembly and an optical head assembly.

Although the Contact-Start-Stop type magnetic disk apparatus has been exemplified and described in the embodiments, the present invention is applicable to other types of magnetic disk apparatuses, e.g., the Load-Unload type magnetic disk apparatus. This Load-Unload means that the head slider is levitated from and glided over the disk when the disk is rotated, whereas the head slider is allowed to wait in a lamp section outside a disk area when the disk rotation is stopped.

As described above, according to the head slider suspension, the head assembly, the method of manufacturing the head slider suspension, the method of manufacturing the head assembly or the information recording/reproducing apparatus of the present invention, only one coil support section corresponds to only one slider support section, and the slider support section and the coil support section constitute a part of the continuous structure including no joint area. Accordingly, each head slider suspension can individually support the driving coil. Thus, each head slider suspension can be independently treated and driven. The following effect. is therefore achieved. It is possible to reduce the number of components and thereby reduce the manufacturing cost. It is also possible to flexibly adapt to the production of a small quantity of many types.

According to the head slider suspension of one aspect of the invention comprises only one suspension section for supporting the slider support section; and only one arm section for supporting the suspension section, wherein the suspension section and the arm section constitute a part of the continuous structure. Therefore, it is possible to further reduce the number of components.

According to the head slider suspension of another aspect of the invention, the connect section for inserting the fixed pivot therethrough also constitutes a part of the continuous structure. The further reduction in the number of components is therefore achieved.

According to the method of manufacturing the head slider suspension or the method of manufacturing the head assembly of still another aspect of the invention, the step of forming the slider support section and the step of forming the coil support section are substantially concurrently executed, whereby the slider support section and the coil support section constitute a part of a predetermined-shaped continuous structure including no joint area. The manufacturing process is therefore simplified.

According to the method of manufacturing the head slider suspension or the method of manufacturing the head assembly of still another aspect of the invention, the steps of forming the suspension section and the arm section are executed substantially concurrently with the steps of forming the slider: support section and the coil support section, whereby the suspension section and the arm section also constitute a part of the continuous structure. Therefore, the manufacturing process can be greatly simplified, compared to the manufacturing process of the case where the arm section and the suspension section are separately formed and then they are combined to each other.

The information recording/reproducing apparatus according to another aspect of the invention comprises a recording medium on which information can be recorded; a head assembly; and a driving mechanism for driving the head assembly so as to make the head slider of the head assembly moved relatively to the recording medium. It is therefore easy to subtly change the specification of the apparatus and facilitating the custom-made production of the apparatus.

The information recording/reproducing apparatus according to still another aspect of the invention comprises a plurality of head assemblies, wherein the head assemblies are independently driven, whereby the respective head sliders of the head assemblies are movable independently. During recording and reproducing the information, each head slider is not uselessly moved, and thus the efficiency in an access of the head assembly to the recording medium can be optimized. Moreover, only part of a plurality of head assemblies for the recording medium to be accessed can be driven, and thus the; unnecessary power consumption can be reduced.

Obviously many modifications and variations of the present invention are possible in the light of the above teachings. It is therefore to be understood that within the scope of the appended claims the invention may be practiced otherwise than as specifically described.

What is claimed is:

1. A head slider suspension on which a head slider including a head element capable of at least either recording or reproducing information to/from a recording medium and a driving coil constituting a part of a driving mechanism for moving the head slider relatively to the recording medium can be mounted, comprising:

only one slider support section capable of floatably supporting the head slider;

only one coil support section corresponding to the slider support section and being capable of supporting the driving coil by itself; and a wiring pattern electrically connectable to the head slider, wherein the slider support section and the coil support section constitute part of a continuous structure, wherein the continuous structure has a first surface and a second surface, and the wiring pattern extends from the first surface of the continuous structure, around one end of the continuous structure and to the second surface, reaches the slider support section and covers the surface of the slider support section, on which the head slider is to be placed.

2. A head slider suspension according to claim 1, further comprising:

only one suspension section for supporting the slider support section; and only one arm section for supporting the suspension section, wherein the suspension section and the arm section constitute a part of the continuous structure.

3. A head slider suspension according to claim 2, wherein the suspension section is flexible and the arm section is rigid.

4. A head slider suspension according to claim 1, wherein the driving mechanism can swing the head slider around a predetermined fixed pivot externally located.

5. A head slider suspension according to claim 4, further comprising:

a connect section including a hole which the fixed pivot is to be inserted through.

6. A head slider suspension according to claim 5, wherein the connect section constitutes a part of the continuous structure.

7. A head slider suspension according to claim 1, further comprising:

an integrated circuit chip on which circuits associated with an operation of the head slider are integrated. the recording medium.

8. A head slider suspension according to claim 7, wherein the integrated circuit chip is located on the continuous structure surface facing the recording medium.

9. A head assembly comprising:

a head slider suspension according to claim 1; and a head slider floatably supported by the slider support section of the head slider suspension, wherein the head slider is located on the wiring pattern covering the slider support section.

10. A head assembly comprising:

a head slider suspension according to claim 1; and a head slider floatably supported by the slider support section of the head slider suspension.

11. An information recording/reproducing apparatus comprising:

a recording medium on which information can be recorded;

a head assembly according to claim 10, and a driving mechanism for driving the head assembly so as to make the head slider of the head assembly move relatively to the recording medium.

12. An information recording/reproducing apparatus according to claim 11 comprising:

a plurality of head assemblies according to claim 10, wherein the head assemblies are independently driven, whereby the respective head sliders of the head assemblies are movable independently.

* * * * *

UNITED STATES PATENT AND TRADEMARK OFFICE
CERTIFICATE OF CORRECTION

PATENT NO. : 6,507,459 B1
DATED : January 14, 2003
INVENTOR(S) : Takehiro Kamigama It is certified that error appears in the above-identified patent and that said Letters Patent is hereby corrected as shown below:

<u>Column 16,</u>
Lines 2 and 3, please delete "the recording medium."

Signed and Sealed this

Third Day of June, 2003

JAMES E. ROGAN
*Director of the United States Patent and Trademark Office*